United States Patent
Hiller et al.

(10) Patent No.: US 12,154,052 B2
(45) Date of Patent: Nov. 26, 2024

(54) CROSS-ENTERPRISE WORKFLOW ADAPTATION

(71) Applicant: Box, Inc., Redwood City, CA (US)

(72) Inventors: Stephen Hiller, Santa Clara, CA (US); Jón Tómas Grétarsson, Redwood City, CA (US); Seth Morgan Luce Voltz, San Francisco, CA (US); Varun Parmar, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/948,829

(22) Filed: Oct. 1, 2020

(65) Prior Publication Data

US 2021/0103863 A1    Apr. 8, 2021

Related U.S. Application Data

(60) Provisional application No. 62/706,867, filed on Sep. 14, 2020, provisional application No. 62/909,683, filed on Oct. 2, 2019.

(51) Int. Cl.
| | |
|---|---|
| *G06Q 10/0633* | (2023.01) |
| *G06Q 10/0631* | (2023.01) |
| *G06Q 10/10* | (2023.01) |

(52) U.S. Cl.
CPC ... *G06Q 10/0633* (2013.01); *G06Q 10/06316* (2013.01); *G06Q 10/103* (2013.01)

(58) Field of Classification Search
None
See application file for complete search history.

(56) References Cited

U.S. PATENT DOCUMENTS

| 9,148,425 B2 | 9/2015 | Rowe et al. |
| 10,038,731 B2 | 7/2018 | Pearl et al. |

(Continued)

FOREIGN PATENT DOCUMENTS

CN    108256788    7/2018

OTHER PUBLICATIONS

Geisriegler, "Actor Based Business Process Modeling and Execution: a Reference Implementation Based on Ontology Models and Microservices," 2017 43rd Euromicro Conference on Software Engineering and Advanced Applications (SEAA), pp. 359-362 (Year: 2017).*

(Continued)

*Primary Examiner* — Ivan R Goldberg
(74) *Attorney, Agent, or Firm* — Vista IP Law Group, LLP

(57) ABSTRACT

A shared workflow operates over a plurality of execution environments associated with a content management system. A shared workflow is created in a first execution environment. The workflow is posted to a shared location. A particular workflow is selected from an exchange or other shared location and is thereafter configured to execute in a second execution environment. A computing module analyzes the workflow to identify environment-specific parameters. Based on a computer-generated recommendation emerging from the analysis, a user or a computing agent modifies the environment-specific parameter so as to configure the workflow prior to execution in the second execution environment. The first execution environment may correspond to a first department of an enterprise and the second execution environment may correspond to a second department of the same enterprise. Alternatively, the first execution environment may correspond to a first enterprise (Continued)

and the second execution environment may correspond to a second enterprise.

20 Claims, 8 Drawing Sheets

(56) References Cited

U.S. PATENT DOCUMENTS

| | | | |
|---|---|---|---|
| 10,176,435 | B1 | 1/2019 | Sarkar et al. |
| 10,331,416 | B2 | 6/2019 | Chaudhry et al. |
| 10,540,624 | B2 | 1/2020 | Hui et al. |
| 10,853,718 | B2 | 12/2020 | Gottin et al. |
| 10,922,282 | B2 | 2/2021 | Jalagam et al. |
| 11,244,284 | B2 | 2/2022 | Milvaney et al. |
| 2004/0049481 | A1 | 3/2004 | Blevins |
| 2004/0260593 | A1 | 12/2004 | Abraham-fuchs et al. |
| 2006/0074703 | A1* | 4/2006 | Bhandarkar ........ G06Q 30/0242 705/1.1 |
| 2007/0005388 | A1 | 1/2007 | Busch et al. |
| 2007/0157210 | A1 | 7/2007 | Inoue et al. |
| 2007/0203589 | A1* | 8/2007 | Flinn ................. G06Q 10/0633 700/29 |
| 2007/0265900 | A1* | 11/2007 | Moore ............... G06Q 10/0635 705/7.12 |
| 2008/0114791 | A1 | 5/2008 | Takatsu et al. |
| 2008/0183536 | A1 | 7/2008 | Hirabayashi |
| 2009/0172101 | A1 | 7/2009 | Arthursson |
| 2009/0249290 | A1* | 10/2009 | Jenkins .................. G06F 9/451 717/109 |
| 2011/0004583 | A1 | 1/2011 | Honda |
| 2012/0239739 | A1 | 9/2012 | Manglik et al. |
| 2012/0290346 | A1* | 11/2012 | Breiter ............. G06Q 10/06316 705/7.12 |
| 2013/0275475 | A1* | 10/2013 | Ahlborn ............ G06Q 10/0633 707/812 |
| 2015/0067028 | A1 | 3/2015 | Kumar et al. |
| 2015/0082271 | A1* | 3/2015 | Damonte ............ G06Q 10/067 717/105 |
| 2015/0088924 | A1 | 3/2015 | Abadi et al. |
| 2015/0149535 | A1 | 5/2015 | Howard |
| 2015/0370878 | A1* | 12/2015 | Caruana ................. H04L 63/02 707/610 |
| 2017/0048285 | A1 | 2/2017 | Pearl et al. |
| 2017/0068915 | A1* | 3/2017 | Nair ........................ H04L 63/20 |
| 2017/0168765 | A1 | 6/2017 | Fan et al. |
| 2017/0264567 | A1 | 9/2017 | Shetty et al. |
| 2017/0316363 | A1* | 11/2017 | Siciliano .......... G06Q 10/06316 |
| 2019/0026663 | A1 | 1/2019 | Homeyer et al. |
| 2019/0332695 | A1 | 10/2019 | Bensberg et al. |
| 2020/0050330 | A1 | 2/2020 | Schilling et al. |
| 2020/0065152 | A1 | 2/2020 | Parmar et al. |
| 2020/0065313 | A1 | 2/2020 | Patel et al. |
| 2020/0301674 | A1 | 9/2020 | Swope et al. |
| 2020/0380432 | A1 | 12/2020 | Wang et al. |
| 2020/0389543 | A1 | 12/2020 | Swope et al. |
| 2021/0004273 | A1 | 1/2021 | You et al. |
| 2022/0083679 | A1 | 3/2022 | Hiller et al. |

OTHER PUBLICATIONS

Koschmider, "Recommendation-based editor for business process modeling," 2011, Data & Knowledge Engineering, vol. 70, pp. 483-503 (Year: 2011).*
"SharePoint 2013 Workflow—Dynamic Values," AndrewConnell, dated Jul. 17, 2012, URL: https://www.andrewconnell.com/blog/SP2013-Workflow-Dynamic-Values/.
"Workflow Variable Datatype Conversion," Informatica, dated Apr. 15, 2019, URL: https://docs.informatica.com/data-integration/data-services/10-2/developer-workflow-guide/workflow-variables/workflow-variable-datatype-conversion.html.
Vansickle, M., "Creating Dynamic Variable Types," UIPath Forum post, dated Aug. 9, 2019, URL: https://forum.uipath.com/t/creating-dynamic-variable-types/141077.
"Developing Web Views for VMware vCenter Orchestrator," vRealize Orchestrator 5.5, VMWare, Copyright 2017.
"VMware vCenter Orchestrator 5.5 Release Notes," VMWare, dated Jun. 26, 2017.
"Developing with VMware vCenter Orchestrator," vRealize Orchestrator 5.5.1, VMWare, Copyright 2014.
"Developing a Web Services Client for VMware vCenter Orchestrator," vRealize Orchestrator 5.5.1, VMWare, Copyright 2014.
"VMware vCenter Orchestrator 5.5.1 Release Notes," VMWare, dated Jun. 23, 2017.
"Using the VMware vCenter Orchestrator Client," vRealize Orchestrator 5.5.1, VMWare, Copyright 2014.
"Installing and Configuring VMware vCenter Orchestrator," vRealize Orchestrator 5.5.2, VMWare, Copyright 2014.
VMware vCenter Orchestrator 5.5.2 Release Notes, VMWare, dated Jun. 16, 2017.
"Using VMware vCenter Orchestrator Plug-Ins," vRealize Orchestrator 5.5.2, VMWare, Copyright 2014.
"VMware vCenter Orchestrator 5.5.3 Release Notes," VMWare, dated Jun. 23, 2017.
"VMware vCenter Orchestrator 5.5.2.1 Release Notes," VMWare, dated Jun. 16, 2017.
Final Office Action for U.S. Appl. No. 16/726,093 dated Oct. 26, 2021.
Non-Final Office Action for U.S. Appl. No. 16/726,093 dated Apr. 15, 2021.
"ProcessMaker Advanced Workflow for DocuSign," DocuSign, date obtained via Google as 2018, URL: https://partners.docusign.com/s/partner-solution/aNR1W000000001I/processmaker-advanced-workflow-for-docusign-esignature.
"DocuSign Electronic Signature Workflow," ProcessMaker, date obtained via Google as Dec. 5, 2016, URL: https://www.processmaker.com/landing/processmaker-docusign/.
Glatard, T., et al. "Software architectures to integrate workflow engines in science gateways," Future Generation Computer Systems vol. 75, Oct. 2017, pp. 239-255.
"Data Object Classes," copyright 2013, DNAnexus, Inc.
"Metadata API Developer Guide," SalesForce, Version 46.0, dated 2019.
"Cúram Workflow Reference Guide," Version 6.0.4, Copyright 2011, Cúram Software Limited.
"Developer Tutorials/Workflow Build Process," copyright 2013, DNAnexus, Inc.
"IBM Case Manager target object store extensions," IBM Corporation, Copyright 2016.
Vardigan, M., et al., "Creating Rich, Structured Metadata: Lessons Learned in the Metadata Portal Project," IASSIST Quarterly, dated 2014.
"User Guide," Informatica® Test Data Management 10.2.1, dated May 2018.
"Do more with Dropbox using your favorite tools," Dropbox, date found via Internet Archive as Mar. 8, 2021, URL: https://www.dropbox.com/features/extensions.
"Build better campaigns with Dropbox for Salesforce Marketing Cloud," Dropbox Team, dated Jun. 17, 2019, URL: https://blog.dropbox.com/topics/product-tips/dropbox-marketing-cloud.
English Translation of CN-108256788-A, translated on Sep. 28, 2021 (original reference published on Jul. 6, 2018).
Non-Final Office Action for U.S. Appl. No. 16/726,081 dated Oct. 4, 2021.
Final Office Action for U.S. Appl. No. 16/553,161 dated Jan. 24, 2023.
Notice of Allowance dated Sep. 21, 2022 for U.S. Appl. No. 17/447,562.
Non-Final Office Action dated Apr. 20, 2021 for related U.S. Appl. No. 16/553,144.
Bellini, et al. A Workflow Model and Architecture for Content and Metadata Management Based on Grid Computing. ECLAP 2013, pp. 118-127. (Year: 2013).
Belhajjame et al. Metadata Management in the Taverna Workflow System. IEEE International Symposium on Cluster Computing and the Grid, 2008, pp. 651-656. (Year: 2008).

(56) References Cited

OTHER PUBLICATIONS

Final Office Action dated Aug. 31, 2021 for related U.S. Appl. No. 16/553,144.
Glatard, T. et al., "Software architectures to integrate workflow engines in science gateways", Future Generation Computer Systems, vol. 75, (Oct. 2017).
Duranova, E. "Data Object Classes", DNAnexus, (last edited on Oct. 4, 2018).
"Informatica® Test Data Management 10.2.1", User Guide, (May 2018).
Zalcman, A. "Developer Tutorials/Workflow Build Process", DNAnexus, (last edited on Oct. 4, 2018).
Salesforce, "Metadata API Developer Guide", Version 46.0, Summer '19, (Last updated: May 22, 2019).
IBM Cúram Social Program Management, Cúram Workflow Reference Guide, Version 6.0.4.
Non-Final Office Action dated Nov. 8, 2021 for realated U.S. Appl. No. 16/553,161.
Vardigan, Mary, et al. "Creating Rich, Structured Metadata: Lessons Learned in the Metadata Portal Project." IASSIST Quarterly 38.3 (2015): 15-15.
Jensen et al. Using Characteristics of Computational Science Schemas for Workflow Metadata Management. IEEE Congress on Services 2008—Part I, pp. 445-452. (Year: 2008).
Non-Final Office Action for U.S. Appl. No. 16/553,144 dated Mar. 10, 2022.
Notice of Allowance for U.S. Appl. No. 16/726,093 dated Feb. 25, 2022.
Final Office Action for U.S. Appl. No. 16/553,161 dated Mar. 21, 2022.
Notice of Allowance for U.S. Appl. No. 16/726,093 dated Apr. 14, 2022.
Final Office Action for U.S. Appl. No. 16/726,081 dated Apr. 14, 2022.
Notice of Allowance for U.S. Appl. No. 16/726,081 dated Jan. 26, 2023.
Notice of Allowance dated Dec. 30, 2022 for U.S. Appl. No. 16/726,093.
Notice of Allowance for U.S. Appl. No. 16/726,093 dated Aug. 31, 2022.
Non-Final Office Action for U.S. Appl. No. 16/553,161 dated Aug. 15, 2022.
Final Office Action for U.S. Appl. No. 16/553,144 dated Aug. 5, 2022.
Non-Final Office Action for U.S. Appl. No. 16/726,081 Dated Aug. 5, 2022.
Notice of Allowance dated Feb. 15, 2023 for U.S. Appl. No. 16/726,093.
Non-Final Office Action dated Feb. 17, 2023 for U.S. Appl. No. 16/553,144.
Notice of Allowance dated May 11, 2023 for U.S. Appl. No. 16/553,161.
Non-Final Office Action dated Jan. 24, 2024 for related U.S. Appl. No. 16/553,144.
What is Dubin Core (DC)? https://techtarget.com/whatis/definition/Dublin-Core, 2008, pp. 1-7. (Year: 2008).
Final Office Action dated Aug. 1, 2023 for related U.S. Appl. No. 16/553,144.
Notice of Allowance dated Aug. 23, 2023 for related U.S. Appl. No. 17/447,562.
Final Office Action dated Jun. 4, 2024 for related U.S. Appl. No. 16/553,144.
Non-Final Office Action dated Jul. 25, 2024 for related U.S. Appl. No. 18/400,560.

\* cited by examiner

CROSS-ENTERPRISE WORKFLOW ADAPTATION

RELATED APPLICATIONS

The present application claims the benefit of priority to U.S. Provisional Patent Application Ser. No. 62/706,867 titled "CROSS-ENTERPRISE WORKFLOW ADAPTATION", filed on Sep. 14, 2020, and the present application claims the benefit of priority to U.S. Provisional Patent Application Ser. No. 62/909,683 titled "WORKFLOW IMPLEMENTATION", filed on Oct. 2, 2019; both of which are hereby incorporated by reference in their entirety.

TECHNICAL FIELD

This disclosure relates to content management systems, and more particularly to techniques for cross-enterprise workflow adaptation.

BACKGROUND

Cloud-based content management services and systems have impacted the way personal and enterprise computer-readable content objects (e.g., files, documents, spreadsheets, images, programming code files, etc.) are stored, and has also impacted the way such personal and enterprise content objects are shared and managed. Content management systems provide the ability to securely share large volumes of content objects among trusted users (e.g., collaborators) on a variety of user devices such as mobile phones, tablets, laptop computers, desktop computers, and/or other devices.

Modern content management systems can host many thousands or, in some cases, millions of files for a particular enterprise that are shared by hundreds or thousands of users. Moreover, the enterprise can establish policies, permissions, and rules managed by the content management system to control access to the files. For example, a policy might be established to accommodate unfettered file access by any members of a particular department, while at the same time, restricting access to those same files by others who are not members of that particular department.

Furthermore, the enterprise can establish workflows that bring consistency to how users operate over certain files. In many cases, a workflow might be shared between multiple entities. For example, workflow might be accessible by two or more departments within the enterprise. In use, for example, a workflow that includes review and approval operations to be performed over a file (e.g., a marketing budget increase request document) might in one instance be performed by marketing personnel (e.g., to approve the budget plan), and in another instance be performed by accounting personnel (e.g., to approve the budget dollar amounts). In this case, members of two different organizations within the enterprise share a particular workflow but execute it in different ways. The proliferation of such intra-enterprise workflows has led to an interest in sharing workflows across enterprises. For example, a content management system provider may want to offer access to various workflows as a service to a wide range of collaborators, including collaborators from different departments and/or collaborators from different enterprises.

Unfortunately, there are no known techniques to be able to efficiently share workflows across different execution environments. As an example, while a workflow to "select the next deal approved by Marketing in the "deal folder" and obtain e-signatures for all Accounting signatories" might execute without issue in a particular enterprise where the same execution environment exists (e.g., at headquarters of the enterprise), many problems may arise when attempting to execute the workflow in a field office of the enterprise. Still more problems may arise when attempting to execute the workflow in another enterprise. For example, the name and file system location of a "deal folder" at a first enterprise can be completely different than the name and file system location at a second enterprise. Moreover, the group names (e.g., "Marketing" and "Accounting") and/or the signatory names and permissions may be different between the enterprises. As such, unless modified to reconcile differences between the enterprises, the workflow might not execute at the second enterprise. This problem might be soluble by creating multiple versions of a particular workflow that are specifically configured to operate at respective enterprises. However, at least inasmuch as there may be hundreds or thousands of different enterprises that share that same workflow, such an approach is not scalable. Moreover, this approach requires that the workflow execution environment differences and/or other differences between enterprises be known in advance. What is needed are ways to codify and process a workflow such that it is sharable across enterprises. Moreover, what is needed is a technique or techniques for efficiently sharing workflows across multiple enterprises and environments.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for cross-enterprise workflow adaptation, which techniques advance the relevant technologies to address technological issues with legacy approaches. More specifically, the present disclosure describes techniques used in systems, methods, and in computer program products for adapting workflows for execution in different computing environments. Certain embodiments are directed to technological solutions for emulating execution of a workflow to configure the workflow for actual execution in a target execution environment.

The disclosed embodiments modify and improve over legacy approaches. In particular, the herein-disclosed techniques provide technical solutions that address the technical problems attendant to efficiently sharing workflows over multiple enterprises and environments. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations that address the various technical problems underlying how to efficiently share workflows over multiple enterprises and environments it emerges that both memory usage and CPU cycles demanded are significantly reduced as compared to the memory usage and CPU cycles that would be needed but for practice of the herein-disclosed techniques. Strictly as one example, the analysis and emulation methods disclosed herein and their use serve to reduce both memory usage and CPU cycles as compared to alternative approaches (e.g., the heretofore-mentioned unscalable approaches). More specifically, the disclosed techniques for analyzing a workflow and/or for emulating execution of a workflow to adapt and configure the workflow for actual execution in a target execution environment overcomes long standing yet heretofore unsolved technological problems associated with efficiently sharing workflows over multiple enterprises and computing system environments.

Many of the herein-disclosed embodiments for emulating execution of a workflow to configure the workflow for actual execution in a target execution environment are technological solutions pertaining to technological problems that arise in the hardware and software arts that underlie content management systems. Aspects of the present disclosure achieve performance and other improvements in peripheral technical fields including, but not limited to, computer object sharing and human-computer interfaces.

Some embodiments include a sequence of instructions that are stored on a non-transitory computer readable medium. Such a sequence of instructions, when stored in memory and executed by one or more processors, cause the one or more processors to perform a set of acts for emulating execution of a workflow to configure the workflow for actual execution in a target execution environment.

Some embodiments include the aforementioned sequence of instructions that are stored in a memory, which memory is interfaced to one or more processors such that the one or more processors can execute the sequence of instructions to cause the one or more processors to implement acts for emulating execution of a workflow to configure the workflow for actual execution in a target execution environment.

In various embodiments, any combinations of any of the above can be combined to perform any variations of acts for adapting workflows for execution in different computing environments, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
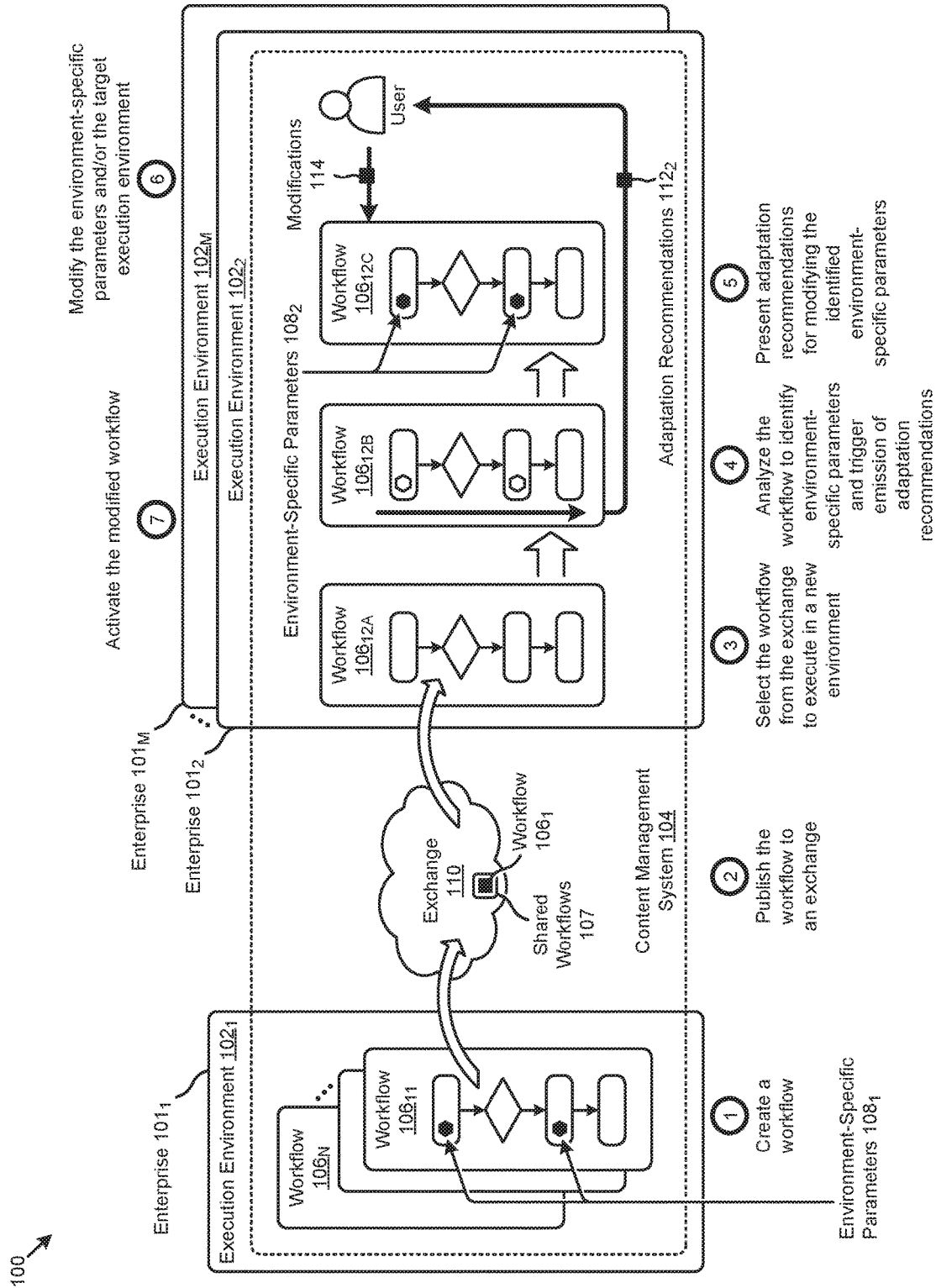
FIG. 1 shows a computing environment in which aspects of shared workflow adaptation can be practiced.

Aspects of the present disclosure solve problems associated with using computer systems for efficiently sharing workflows over multiple enterprises and environments. These problems are unique to, and may have been created by, various computer-implemented methods for efficiently sharing workflows over multiple enterprises and environments in the context of content management systems. Some embodiments are directed to approaches for emulating execution of a workflow to configure the workflow for actual execution in a target execution environment. The accompanying figures and discussions herein present example environments, systems, methods, and computer program products for adapting workflows for execution in different computing environments.

OVERVIEW

Disclosed herein are techniques for analyzing and/or emulating execution of a workflow to configure the workflow for execution over multiple execution environments. As used herein, an execution environment is a computing setting in which a workflow is to be executed that is distinct from other computing settings according to one or more computer setting attributes that are relevant to the execution of the workflow. The attributes of the computer setting and/or any environmental conditions or environmental attributes might pertain to file system structures, file system content, user profiles, user roles, user and content object permissions, organizational structures, naming taxonomies, policies, availability and/or structure of metadata, and/or other attributes associated with the execution environment. The respective execution environments associated with various enterprises or even various groups within an enterprise are often distinct. In certain embodiments, a workflow is created to operate in a first execution environment of a first department of an enterprise and is shared to be able to operate in a second execution environment of a second department of the same enterprise. In certain embodiments, a workflow is created to operate in a first execution environment of a first enterprise and is shared to be able to operate in a second execution environment of a second enterprise.

For example, a workflow might be created for the first enterprise to "select the next deal approved by Marketing in the deal folder and obtain e-signatures for all Accounting signatories". As the workflow is created for the first enterprise, the workflow will be configured to operate in the execution environment (e.g., the first execution environment) associated with the first enterprise. In some cases, the creators and/or owners and/or curators of the workflow may want to provision access to the workflow by other enterprises. In this example case, a second enterprise can then select the workflow to execute in a respective second execution environment. Once selected, execution of the workflow is analyzed to identify various workflow configuration requirements. Such analysis might include scanning the data objects that describe the workflow to identify the requirements. According to the foregoing workflow example, a workflow configuration requirement might pertain to identification of a file system location of the "deal folder" in the second execution environment of the second enterprise. When all of the workflow configuration requirements have been identified and addressed, the workflow can be executed in the second execution environment. In certain embodiments, one or more adaptation recommendations for addressing respective workflow configuration requirements are generated. In certain embodiments, such adaptation recommendations are based at least in part on environment attributes associated with the second execution environment, methods performed by other enterprises to satisfy workflow configuration requirements, and/or other information.

As used herein, an adaptation recommendation is a set of one or more acts that specify a change to a subject workflow, or that specify a change to a target execution environment. An adaptation recommendation can be addressed by a human user or by a computing agent.

In certain environments, a workflow is codified in a structured form (e.g., a JSON-based template) having one or more environment-specific variables. In certain embodiments, a workflow configuration requirement is addressed by assigning a value to an environment-specific variable. In certain embodiments, a workflow configuration requirement can be addressed and resolved either with or without human interaction.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 shows a computing environment 100 in which aspects of shared workflow adaptation can be practiced. As an option, one or more variations of computing environment 100 or any aspect thereof may be implemented in the context of the architecture and functionality of the embodiments described herein and/or in any in any environment.

FIG. 1 illustrates aspects pertaining to analyzing a workflow to configure the workflow for actual execution in a target execution environment. Specifically, FIG. 1 presents a logical depiction of how the herein disclosed techniques are used to select and modify a shared workflow from a first execution environment to execute in a second execution environment. Representative sets of high order operations are also presented to illustrate how the herein disclosed techniques might be applied in computing environment 100.

Referring to the logical depiction of FIG. 1, multiple execution environments (e.g., execution environment $102_1$, execution environment $102_2$, . . . , execution environment $102_M$) can be associated with a content management system 104. As shown, the execution environments may correspond to respective enterprises (e.g., enterprise $101_1$, enterprise $101_2$, . . . , enterprise $101_M$) that are users of content management system 104. In some cases, the execution environments may correspond to groups within an enterprise. Content management system 104 may host many thousands or, in some cases, millions of content objects (e.g., files, etc.) for the enterprises or groups that are shared by hundreds or thousands of users (e.g., employees, contractors, etc.). As earlier mentioned, various workflows are often established to operate over the aforementioned corpus of content objects, some of which workflows are to be shared across executions environments and/or enterprises and/or groups. However, there are no known techniques to be able to efficiently share workflows across different execution environments.

The herein disclosed techniques address such challenges pertaining to efficiently sharing workflows over multiple enterprises and environments. Consider that enterprise $101_1$ has established a set of workflows (e.g., workflow $106_{11}$, . . . , workflow $106_N$) to be executed over select content objects in execution environment $102_1$. Specifically, enterprise $101_1$ has created an instance (e.g., workflow $106_{11}$) of a workflow $106_1$ that operates in execution environment $102_1$ (operation 1). As can be observed, workflow $106_{11}$ has a set of environment-specific parameters $108_1$ that facilitate execution of the workflow in whatever is the then-current local execution environment. As used herein, an environment-specific parameter refers to any condition or configuration of an underlying computer setting. As used herein, an environment-specific parameter may impact the manner in which a workflow is carried out in its corresponding computing environment. Notwithstanding, an environment-specific parameter may have different semantics or meanings even though the environment-specific parameter may be assigned to the same literal value in two different environments. For example, the environment-specific parameter "root_folder='/usr/bin'" for a computing system within ABC.com would refer to a different file system than "root_folder='/usr/bin'" for a computing system within XYZ.com.

When the operation of workflow $106_{11}$ is established in execution environment $102_1$, enterprise $101_1$ publishes a sharable instance (e.g., workflow $106_1$) of workflow $106_{11}$ to a set of shared workflows 107 hosted in an exchange 110 managed by content management system 104 (operation 2). In this particular embodiment, the functions of exchange 110 is provided as a facility of content management system 104, however, other forms of providing accessibility to shared workflows 107 are possible. Specifically, exchange 110 might be operated by a third party, or the exchange might be hosted at an Internet-accessible location, or the exchange might be merely some shared storage location that two different departments of the same enterprise can access for the purpose of sharing workflows.

At some later moment in time, enterprise $101_2$ may be seeking a workflow having characteristics that match the characteristics of workflow $106_1$. After browsing the shared workflows 107 hosted by exchange 110, enterprise $101_2$ selects the workflow $106_1$ to execute in execution environment $102_2$ (operation 3). As shown, workflow $106_1$ is uploaded to execution environment $102_2$ as an initial local instance (e.g., workflow $106_{12A}$) of the workflow. Workflow $106_{12A}$ is analyzed to identify any environment-specific parameters associated with the workflow (operation 4). For example, execution of workflow $106_{12A}$ can be emulated by traversing the workflow and identifying enterprise-specific parameters in the workflow that are in conflict with the local environment attributes (e.g., file and folder structures, usernames, and roles, etc.). The outcome of the foregoing analysis and/or emulation is an instance (e.g., workflow $106_{12B}$) of workflow $106_1$ that has some or all environment-specific parameters identified (e.g., marked, flagged, etc.) for modification.

As depicted, a set of adaptation recommendations 1122 are triggered, generated and presented to facilitate modification of the identified environment-specific parameters (operation 5). More particularly, the act of identification of a particular environment-specific parameter may trigger generation of a recommendation, and one or more actions pertaining to the recommendation might be suggested in the adaptation recommendations. For example, the act of identification of a particular environment-specific parameter pertaining to a root folder may trigger emission of a recommendation to identify the file system location of a root folder associated with the workflow. The particular adaptation recommendations discussed in this paragraph correspond to the target execution environment (e.g., execution environment $102_2$) although other recommendations are possible. As discussed herein, generation of adaptation recommendations are triggered by one or more system components that identify an occurrence of an environment-specific parameter within or used by a workflow. More specifically, the act of identification of an environment-specific parameter of a subject workflow causes generation of adaptation recommendations, which adaptation recommendations are in turn based on the subject workflow itself in comparison to then-current characteristics of the target execution environment.

The generated adaptation recommendations may be presented to a user (e.g., system administrator) who performs various modifications (e.g., modifications 114) to one or more of the identified environment-specific parameters to enable the workflow for execution in execution environment $102_2$ (operation 6). Specifically, the user establishes a set of environment-specific parameters $108_2$ to achieve an executable instance (e.g., workflow $106_{12C}$) of the workflow that is ready to be activated (operation 7) in execution environment $102_2$. In some cases, one or more of the environment-specific parameters $108_2$ can be modified automatically by a computing agent, possibly without involving human interaction.

One embodiment of techniques for analyzing a workflow to configure the workflow for actual execution in a target execution environment is disclosed in further detail as follows.

Figure 2:
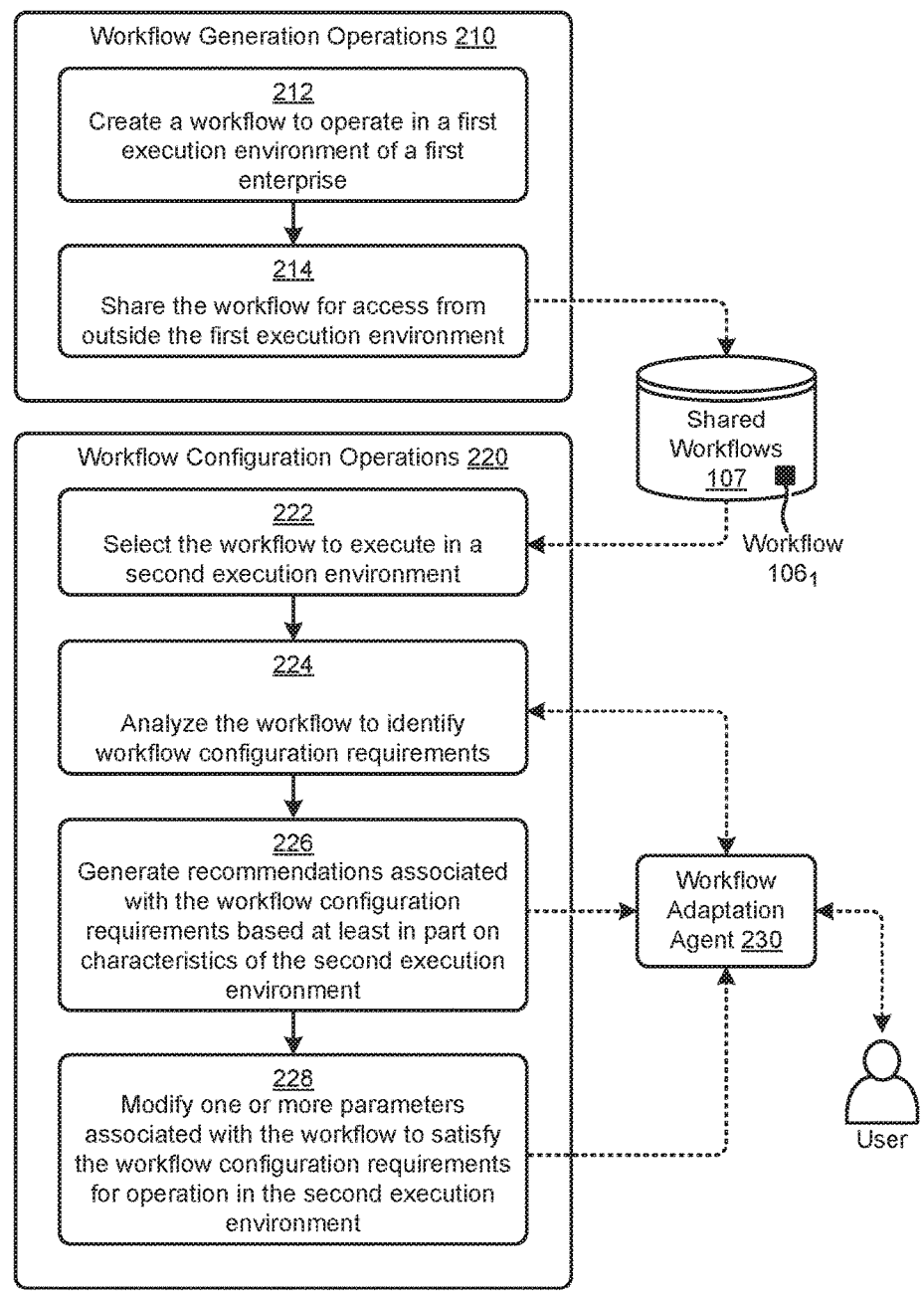
FIG. 2 depicts a cross-enterprise workflow sharing technique as implemented in systems that adapt workflows for execution in different computing environments, according to an embodiment.

FIG. 2 depicts a cross-enterprise workflow sharing technique 200 as implemented in systems that adapt workflows for execution in different computing environments. As an option, one or more variations of cross-enterprise workflow sharing technique 200 or any aspect thereof may be implemented in the context of the architecture and functionality of the embodiments described herein and/or in any in any environment.

FIG. 2 illustrates aspects pertaining to analyzing a workflow to configure the workflow for actual execution in a target execution environment. Specifically, the figure is presented to illustrate one embodiment of certain steps and/or operations performed over a network of devices (e.g., user devices, computing systems, etc.) that analyze and/or emulate a shared workflow to determine recommendations and/or workflow modifications to facilitate operation of the workflow in an execution environment of a target enterprise. As can be observed, the steps and/or operations can be grouped into a set of workflow generation operations 210 and a set of workflow configuration operations 220.

Workflow generation operations 210 of cross-enterprise workflow sharing technique 200 commences by a workflow being created to operate in a first execution environment of a first enterprise (step 212). The workflow may be created with the intent that it will be shared. In some cases the workflow is developed in a development environment, with or without access to components to the content management system. In some cases, a workflow is developed by a human or multiple humans, whereas in other cases, the workflow is developed, at least in part, by an automated template workflow builder. In this latter case, the automated template workflow builder may include a module that observes events that occur in the content management system (e.g., user actions) and then, based on analysis (e.g., machine learning) of the observed events, (1) workflow triggering events, (2) workflow outcomes and (3) workflow operations can be automatically defined and codified in the manner needed by a workflow compiler.

The workflow may be codified in a structured form (e.g., in JSON) to facilitate processing by various computing agents (e.g., an emulator). The workflow is then shared for access outside of the first execution environment (step 214). As shown, a workflow $106_1$ might be contained in a set of shared workflows 107 for access by execution environments that are distinct from the first execution environment. In some case, shared workflows 107 may be accessed by groups, divisions, and/or other entities within a particular enterprise (e.g., the first enterprise).

According to workflow configuration operations 220, a workflow is selected for execution in a second execution environment (step 222). For example, a second enterprise associated with the second execution environment may desire a workflow having the characteristics of workflow $106_1$ and download it from shared workflows 107. As earlier mentioned, shared workflows 107 may be presented in an exchange or marketplace (e.g., workflow "store") managed by a content management system provider and/or some other entity.

To facilitate enabling the selected workflow in the second environment, execution of the workflow is analyzed and/or emulated to identify any workflow configuration requirements (step 224). Such workflow configuration requirements describe any modifications to the workflow and/or the target execution environment to facilitate execution of the workflow in the target execution environment. For example, modifications to one or more environment-specific parameters (e.g., the setting of values of environment-specific variables), flow steps and/or sequences, and/or any other modifications may be needed to execute the workflow in the target execution environment.

Certain modifications to the target execution environment itself may be required. As an example, if a certain content object (e.g., a folder, a file, etc.) is identified as pertinent to the workflow, permissions (e.g., read-write permissions) may need to be modified to facilitate execution of the workflow within the target execution environment. For example, if the intended root folder was not associated with access permissions sufficient for the user to execute the workflow, then the permissions of the intended root folder may need to be modified.

As illustrated, a workflow adaptation agent 230 might facilitate analysis and emulation of the workflow, and/or a workflow adaptation agent 230 might automatically respond to an emitted recommendation. In the case of emulation, a temporary environment (e.g., sandbox) might be set up. Such a temporary environment might be sequestered or otherwise isolated from any production environments. Moreover, a such a temporary environment might be configured such that a plurality of possible adaptations can be evaluated. Any one or more of such possible adaptations can include adaptation of the environment (e.g., permissions) in which the workflow executes, and/or such possible adaptations can include candidate variable values. In some situations, a trial-and-error approach is taken, and a report of: (1) encountered problems, and (2) what configurations were deemed to resolve the encountered problems is provided to the user. In some cases, in particular when several resolutions were considered with respect to a particular problem, a recommendation of the "best" resolution is provided to the user.

In some cases, a set of adaptation recommendations associated with the workflow configuration requirements are generated based at least in part on characteristics of the second execution environment itself (step 226). This can occur, for example, at the time of identification of an environment-specific parameter of a workflow, where the environment-specific parameter is known to pertain to an arbitrary target environment. This is because, at the time that the workflow is authored, the characteristics of an arbitrary target execution environment cannot be known, and as such, this processing is necessarily deferred until the workflow is situated in the target execution environment. In some cases, at the time of identification of an environment-specific parameter of a workflow, an agent (e.g., a computing module that serves as a proxy for a user), is executed so as to determine if a workflow adaptation can be automatically determined, and thus reduce reliance on a human user to respond to a recommendation.

As illustrated, workflow adaptation agent 230 might access certain environment attributes that characterize the second execution environment to generate a set of adaptation recommendations for any workflow configuration requirements that have been identified. As examples, workflow adaptation agent 230 might access a local file system structure associated with the second execution environment to recommend a root folder setting to modify in the workflow. Based at least in part on the adaptation recommendations and/or other information, one or more parameters (e.g., environment-specific parameters) associated with the workflow are modified to satisfy the workflow configuration requirements for operation in the second execution environment (step 228). According to the foregoing example, a parameter that codifies the root folder setting is modified automatically (e.g., by workflow adaptation agent 230) or manually (e.g., by a user) to facilitate execution of the workflow in the second execution environment.

One embodiment of a system, data flows, and data structures for implementing the cross-enterprise workflow sharing technique 200 and/or other herein disclosed techniques is disclosed as follows.

Figure 3:
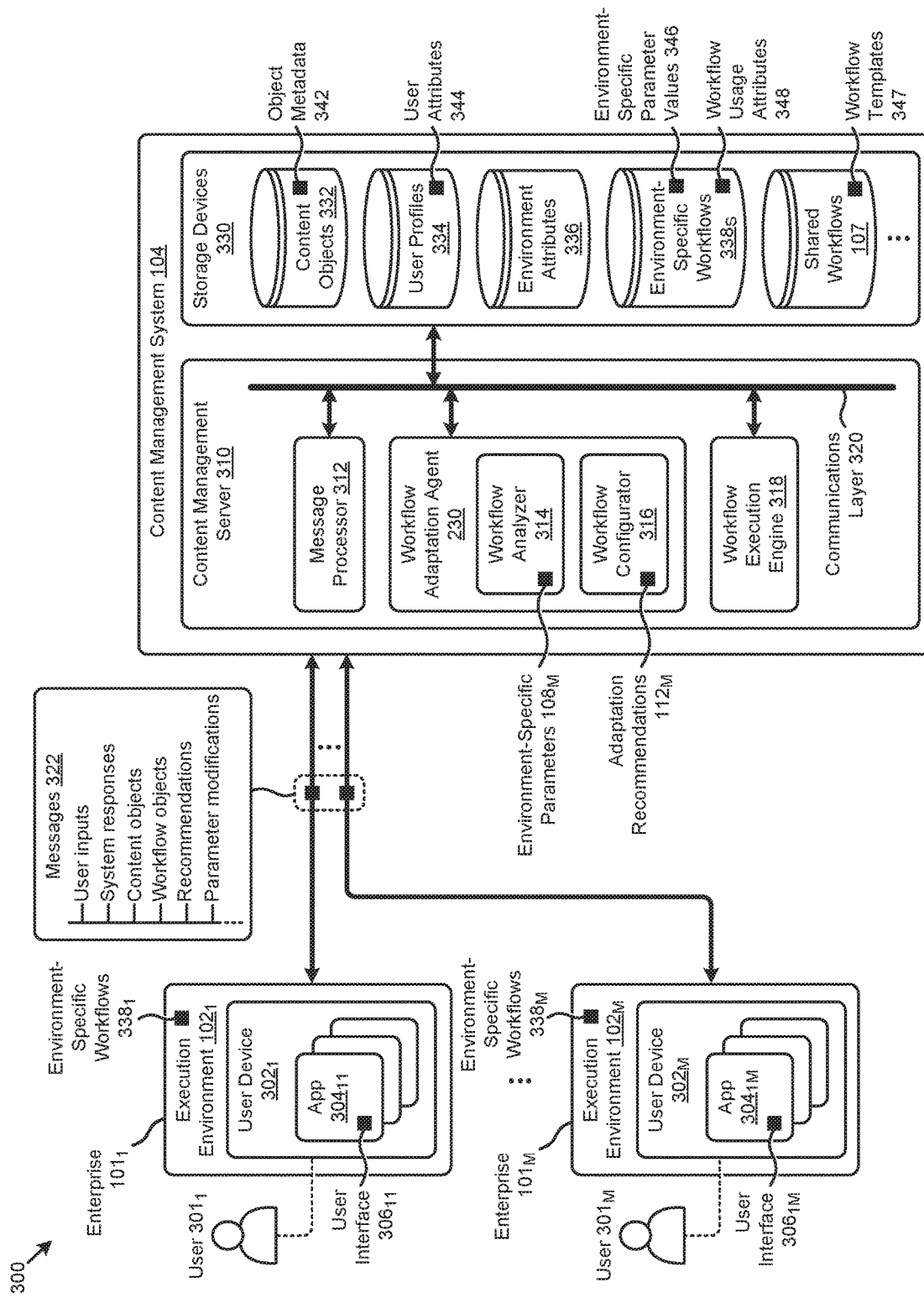
FIG. 3 is a block diagram of a system that adapts workflows for execution in different computing environments, according to an embodiment.

FIG. 3 is a block diagram of a system 300 that adapts workflows for execution in different computing environments. As an option, one or more variations of system 300 or any aspect thereof may be implemented in the context of the architecture and functionality of the embodiments described herein and/or in any in any environment.

FIG. 3 illustrates aspects pertaining to analyzing a workflow to configure the workflow for actual execution in a target execution environment. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $301_1$, . . . , user $301_M$) from respective enterprises (e.g., enterprise $101_1$, . . . , enterprise $101_M$) that interact with other users from their respective enterprises and a set of content objects 332 managed at a content management system 104. A content management system such as content management system 104 manages a plurality of content objects at least in part by maintaining (e.g., storing, updating, resolving interaction conflicts, etc.) the content objects subject to the various interactions performed over the content objects by users of the content objects. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of content management server 310 operating at content management system 104. Content management server 310 comprises an instance of a message processor 312, an instance of a workflow adaptation agent 230, and an instance of a workflow execution engine 318. Workflow adaptation agent 230 comprises a workflow analyzer 314 and a workflow configurator 316. A plurality of instances of the foregoing components might operate at a plurality of instances of servers (e.g., content management server 310) at content management system 104 and/or any portion of system 300.

Such instances can interact with a communications layer 320 to access each other and/or a set of storage devices 330 that store various information to support the operation of the components of system 300 and/or any implementations of the herein disclosed techniques.

Specifically, and as can be observed, the servers and/or storage devices of content management system 104 facilitate interactions over content objects 332 by the users (e.g., user $301_1$, . . . , user $301_M$) from a respective set of user devices (e.g., user device $302_1$, . . . , user device $302_M$). In some cases, such interactions are performed using the respective user interfaces (e.g., user interface $306_{11}$, . . . , user interface $306_{1M}$) of various applications (e.g., app $304_{11}$, app $304_{1M}$) operating on the user devices. As described herein, such interactions are often organized into workflows that are configured for execution in a local computing environment. As shown, for example, user $301_1$ might interact with a respective set of content objects using a set of environment-specific workflows $338_1$ that are configured to operate in an execution environment $102_1$ associated with enterprise $101_1$. User $301_M$ might also interact with a respective set of content objects using a set of environment-specific workflows $338_M$ that are configured to operate in an execution environment $102_M$ associated with enterprise $101_M$. User interactions often involve instances of messages 322 transferred to and from content management system 104.

As can be observed, such messages can pertain to user inputs, system responses, content objects, workflow objects, adaptation recommendations, parameter modifications, and/or other data objects. The content objects (e.g., files, folders, etc.) in content objects 332 are characterized at least in part by respective sets of object metadata 342 stored at storage devices 330. Furthermore, the users are characterized at least in part by a set of user attributes 344 stored in a set of user profiles 334 at storage devices 330. Each respective execution environment associated with content management system 104 is described by a set of environment attributes 336. The aforementioned environment-specific workflows established for each respective execution environment are managed by content management system 104 in a set of environment-specific workflows $338_S$ stored at storage devices 330. The information contained in environment-specific workflows include the respective instances of environment-specific parameter values 346 associated with the stored workflows and certain sets of workflow usage attributes 348 that describe how users and/or enterprises select, configure, and use the workflows. In some cases, content management system 104 may also manage instances of shared workflows 107 that can be accessed by users of multiple enterprises (e.g., via an exchange or marketplace).

As shown, shared workflows 107 might comprise various instances of workflow templates 347 that facilitate the cross-enterprise adaptation of workflows as disclosed herein. Such workflow templates might be codified as JSON objects, XML, objects, and/or any other structured language or form. According to the herein disclosed techniques, consider that user $301_1$ (e.g., workflow author) of enterprise $101_1$ has developed a subject workflow in the form of a workflow template that is configured for operation as one of the environment-specific workflows $338_1$ in execution environment $102_1$. If user $301_M$ of enterprise $101_M$ desires a workflow having the characteristics of the subject workflow, the user can browse the shared workflows 107 at user device $302_M$ to discover the subject workflow at content management system 104. User $301_M$ selects the subject workflow in an instance of messages 322 that is received by message processor 312. The message indicates that the subject workflow is to be selected and sent to workflow adaptation agent 230 for processing. Message processor 312 also provides other information to workflow adaptation agent 230, such as instances of user attributes 344 and environment attributes 336 corresponding to user $301_M$ and execution environment $102_M$, respectively.

Workflow analyzer 314 consumes the foregoing information to initiate an emulation of the subject workflow in execution environment $102_M$ to discover any workflow configuration requirements necessary to execute the workflow in the target environment. Specifically, workflow analyzer 314 identifies any instances of environment-specific parameters $108_M$ that may need to be modified to facilitate operation of the subject workflow in execution environment $102_M$. Workflow configurator 316 interacts with workflow analyzer 314 to generate and present instances of adaptation recommendations $112_M$ to user $301_M$ and/or to content management system 104. Such adaptation recommendations describe a set of one or more actions a user and/or a system can take to adapt or configure a workflow for execution in a particular execution environment. As an example, an adaption recommendation may present suggested values for respective environment-specific parameters that a user or system agent can select and set. The adaptation recommendations $112_M$ may be based at least in part on the environment attributes 336, user attributes 344, object metadata 342, workflow usage attributes 348, and/or other information. When all adaptation recommendations and/or environment-specific parameters have been addressed according the requirements of execution environment $102_M$, workflow execution engine 318 can facilitate activation and ongoing execution of the resulting environment-specific instance of the subject workflow in execution environment $102_M$.

The foregoing discussions include techniques for creating and sharing a workflow for executing in two or more distinct execution environments, which techniques for creating and sharing a workflow are disclosed in further detail as follows.

Figure 4:
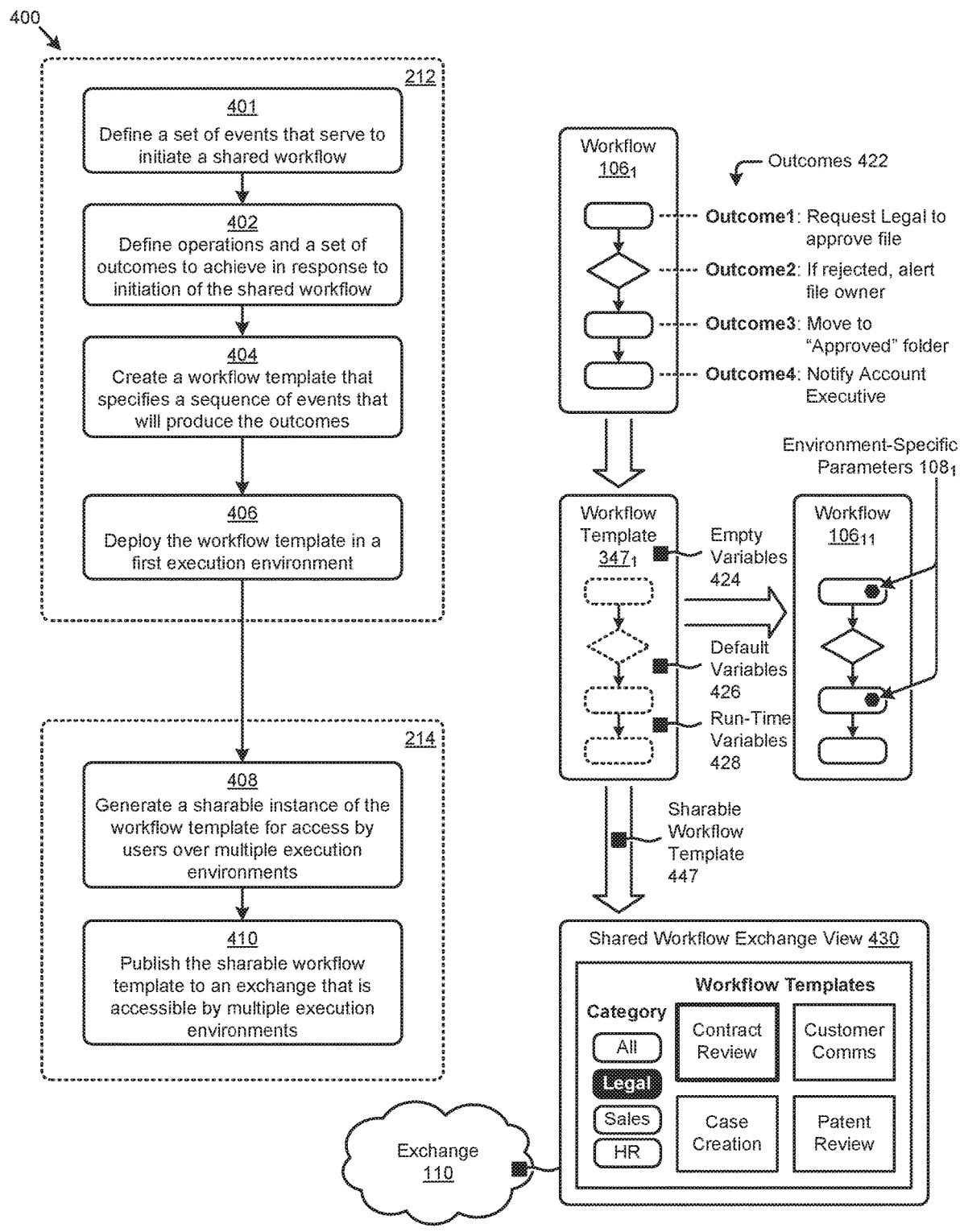
FIG. 4 presents a workflow generation technique as implemented in systems for adapting workflows to execute in different computing environments, according to an embodiment.

FIG. 4 presents a workflow generation technique 400 as implemented in systems for adapting workflows to execute in different computing environments. As an option, one or more variations of a workflow generation technique 400 or any aspect thereof may be implemented in the context of the architecture and functionality of the embodiments described herein and/or in any in any environment.

FIG. 4 illustrates aspects pertaining to analyzing a workflow to configure the workflow prior to execution in a target execution environment. Specifically, the figure is presented to illustrate one embodiment of certain steps and/or operations that facilitate creating and sharing a workflow for access by enterprises and/or execution environments that are distinct from the originating enterprise and/or execution environment. As depicted in the figure, the steps and/or operations are associated with step 212 and step 214 of FIG. 2. A representative scenario is also shown in the figure to illustrate an example application of workflow generation technique 400.

Workflow generation technique 400 commences by defining a set of events that serve to initiate a shared workflow (step 401), and then defining operations that are triggered by the events. The operations are defined such that execution of the operations advance toward achievement of a set of outcomes (step 402). The workflow may be identified for sharing at the time it is created or may be identified for sharing at some moment in time after creation. As indicated in the accompanying scenario, workflow $106_1$ has a set of outcomes 422 (e.g., "Outcome1: Request Legal to approve file", "Outcome2: If rejected, alert file owner", "Outcome3:

Move to 'Approved' folder", and "Outcome4: Notify Account Executive") to facilitate contract reviews by a legal representative.

When the outcomes of the workflow are defined, a workflow template is created that specifies the sequence of events (e.g., operations, decisions, etc.) that will produce the outcomes (step 404). A workflow template, as used herein, is a data object that defines the attributes of a workflow to facilitate adaptation and execution of the workflow in various distinct execution environments, according to the herein disclosed techniques. As used herein, a workflow is a series of operations that are performed under control of a computing module of a content management system. A workflow and/or a workflow template may be created by a human coder, and one or more aspects of a workflow may be created using computer-aided techniques.

In some cases, a content management system may provide to users and/or enterprises one or more applications to facilitate creation of workflows and/or workflow templates. Specifically, a workflow template defines the relationships (e.g., dependencies) and attributes of various tasks that are executed to achieve the outcomes of the workflow. For example, such tasks might include actions (e.g., approvals, reviews, modifications, etc.) over files, folders, metadata, and/or other content objects. The actions are traversed in an order specified in the workflow template in response to certain trigger events, such as a file event (e.g., upload, copy, move, preview, download, delete, lock, unlock, add collaborator, add watermark, remove watermark, apply classification, etc.), a folder event, an action event, and/or other events. In some cases, a trigger event is codified into a trigger object, which trigger object may include information that is relevant to execution of the workflow. Such information can include a workflow entry point specification and/or information that would at least potentially be used during execution of the workflow. The trigger object might include metadata that relates to any operation or decision in a workflow. More specifically, the trigger object might include metadata that relates to an initial entry and configuration of an invoked workflow, or it might include information that is held for later use when the workflow is processing an operation or decision.

To accommodate the aforementioned adaptation and execution of the workflow in various distinct execution environments, the workflow template will comprise various mechanisms that facilitate configurability over the environments. One such mechanism embeds variables in the data object of the workflow template to allow the values assigned to those variables to serve as environment-specific parameters. As can be observed, for example, the data object underlying a workflow template $347_1$ created for workflow $106_1$ comprises a set of empty variables 424, a set of default variables 426, and a set of run-time variables 428. As an example, such variables may be key-value pairs in a JSON object. Empty variables 424 are variables whose values (e.g., file name, folder name, task assignee, task message, etc.) can be set at the time the workflow template $347_1$ is being adapted to a new execution environment. Default variables 426 are pre-populated with values (e.g., target folder name, etc.) which may be modified (e.g., modified by a user or modified by an agent) when workflow template 34'71 is being adapted to the new execution environment. Run-time variables 428 have values (e.g., timestamp of event completion) that are determined at run-time in the new execution environment and cannot be known prior to execution of the workflow. To test the functionality of the workflow, an instance of the workflow template is deployed to a first execution environment (step 406). For example, workflow $106_{11}$ can be derived from workflow template $347_1$ by assigning the environment-specific parameters $108_1$ to the corresponding aforementioned variables (e.g., empty variables 424 and default variables 426) and then executed.

A sharable instance of the workflow template can then be generated for access by users over multiple execution environments (step 408). As an example, a sharable workflow template 447 might be generated from workflow template $347_1$. Preparing the sharable workflow template 447 for general access may involve converting hard-coded settings and/or populated variables to empty variables (e.g., to redact proprietary settings), providing a workflow title and description, and/or other actions. The sharable workflow template is then published to an exchange that is accessible by multiple execution environments (step 410). As highlighted in a shared workflow exchange view 430 associated with exchange 110, sharable workflow template 447 is represented as a "Contract Review" workflow template under the "Legal" category.

The foregoing discussions include techniques for adapting a workflow (e.g., from a workflow template) to a target execution environment by responding (e.g., modifying the workflow template) to recommendations derived from an emulation of the workflow. Certain adaptation techniques are disclosed in detail as follows.

Figure 5:
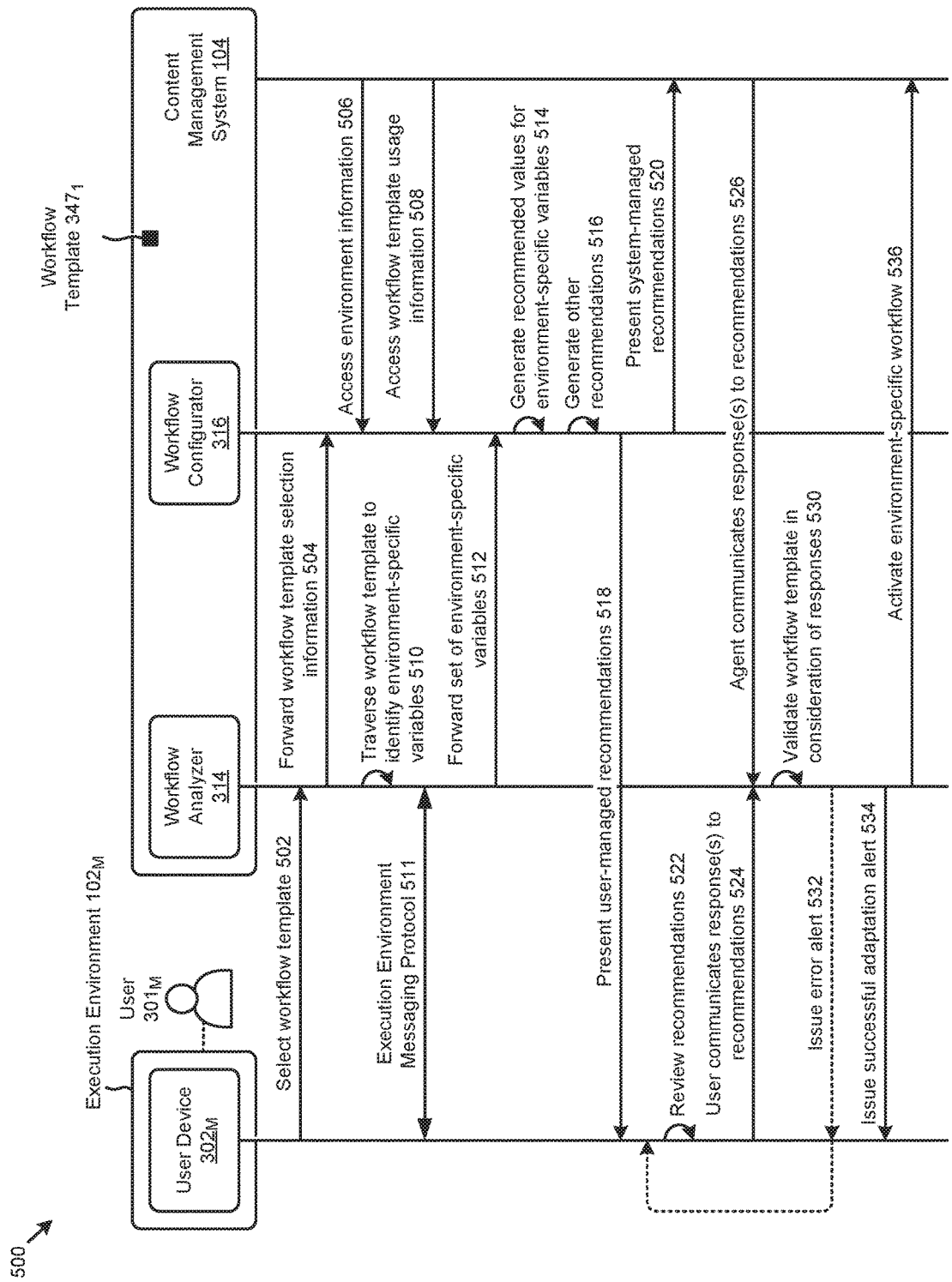
FIG. 5 presents a workflow adaptation technique as implemented in systems that adapt workflows for execution in different computing environments, according to an embodiment.

FIG. 5 presents a workflow adaptation technique 500 as implemented in systems that adapt workflows for execution in different computing environments. As an option, one or more variations of workflow adaptation technique 500 or any aspect thereof may be implemented in the context of the architecture and functionality of the embodiments described herein and/or in any in any environment.

FIG. 5 illustrates aspects pertaining to analyzing a workflow to configure the workflow for actual execution in a target execution environment. Specifically, the figure is presented to illustrate a representative workflow adaptation scenario facilitated by the herein disclosed techniques that involves adapting a workflow (e.g., from a workflow template) to a target execution environment by responding (e.g., modifying the workflow template) to recommendations derived from an emulation of the workflow. More specifically, workflow adaptation technique 500 is illustrated by a workflow template adaptation scenario carried out by user $301_M$ from execution environment $102_M$ and content management system 104. The high order interactions (e.g., operations, messages, etc.) over the participants involved in the scenario are performed by the various computing components earlier described. The particular computing components shown in FIG. 5 are user device $302_M$ of user $301_M$, and workflow analyzer 314 and workflow configurator 316 of content management system 104. The high order interactions of workflow adaptation technique 500 represent merely one embodiment; additional or alternative interactions, messages and operations are possible.

Workflow adaptation technique 500 commences with user $301_M$ selecting a workflow template to adapt to execution environment $102_M$ (message 502). As earlier described, the workflow template might be selected from a workflow exchange or marketplace provided by content management system 104. For illustrative purposes, consider that user $301_M$ selected the workflow template $347_1$ as described herein. The workflow template selection from user $301_M$ is received at workflow analyzer 314 and certain information is forwarded to workflow configurator 316 (message 504). For example, certain identifying information pertaining to user $301_M$, execution environment $102_M$, the selected workflow template (e.g., workflow template $347_1$), and/or other information might be forwarded. In response to receiving the workflow template selection information, workflow configurator 316 accesses information about the target environment (e.g., execution environment $102_M$) from content management system 104 (message 506). Workflow configurator 316 also accesses any historical usage information pertaining to the selected workflow template from content management system 104 (message 508). Any of messages 506, 508, and 512, can occur in any sequence, or with any concurrency. Any operations pertaining to, or responsive to messages 506, 508, and 512, can occur in any sequence, or with any concurrency.

Workflow analyzer 314 traverses the data object underlying the workflow template to identify any environment-specific variables associated with the workflow template (operation 510). Characteristics of the environment in which the workflow is to be executed are shared (e.g., via messaging protocol 511) with the workflow analyzer of the content management system.

As earlier described, environment-specific variables are included in workflow templates to facilitate adaptation of the workflow templates to various execution environments. The environment-specific variables are often codified in the data object as key-value pairs wherein the key is the environment-specific variable and the value is a respective environment-specific parameter. A particular workflow template can be adapted to an execution environment at least in part by setting the values associated with the environment-specific variables to environment-specific parameters that correspond to the execution environment. In some cases, workflow analyzer 314 may be provided the key names to the environment-specific variables that are included in the workflow templates to facilitate discovery of the environment-specific variables.

The identified environment-specific variables are forwarded to workflow configurator 316 (message 512). Workflow configurator 316 uses information about the identified environment-specific variables, the environment (e.g., execution environment $102_M$), usage of the workflow template, and/or other information to generate recommended values for the environment-specific variables (operation 514). For example, as workflow template $347_1$ pertains to contract approvals by one or more assignees from the Legal department, a list of users from execution environment $102_M$ whose profiles indicate they are from the Legal department may be provided as candidate assignees. A recommended location for the "Approval" folder associated with workflow template $347_1$ may also be provided. Other value recommendations are possible.

A set of other types of recommendations are also generated by workflow configurator 316 (operation 516). Other types of recommendations pertain to tasks, triggers, and/or other events that may be added to the workflow template and/or adapted instance of the workflow template. For example, historical usage of workflow template $347_1$ by other parties may indicate that a second approval step is often added to the workflow. As such, a recommendation is generated to highlight that discovery.

When the recommended values and/or other recommendations are generated, a set of user-managed recommendations are presented to user $301_M$ (operation 518) and a set of system-managed recommendations are presented to content management system 104 (operation 520). As used herein, user-managed recommendations are recommendations that a user is to review and address by one or more human-invoked operations. As used herein system-managed recommendations are recommendations that can be automatically addressed by automated computing operations. For example, user $301_M$ may be presented with a list of environment-specific variables with some or all having recommended values selectable in a dropdown menu. User $301_M$ can then review the recommendations (operation 522) and communicate a response to workflow analyzer 314 (message 524). Such responses from user $301_M$ can comprise selection and/or entering of values for the environment-specific variables, modifications to the workflow template (e.g., adding or modifying an event), and/or other responses. Content management system 104 or one or more of its agents will also communicate a response to workflow analyzer 314 (message 526). For example, content management system 104 may have received a recommendation (e.g., instruction) from workflow configurator 316 to change one or more permissions on the "Approved" folder to allow a workflow execution engine to move approved files to the folder in accordance with workflow template $347_1$. Certain permissions associated with the candidate assignees from the Legal department may also need modification. When the system has addressed the recommendations from workflow configurator 316, a confirmation response can be communicated to workflow analyzer 314.

When workflow analyzer 314 has received both user and system responses, the workflow template is validated (operation 530). The validation operation is a foundational operation of the workflow template emulation as it verifies that the workflow template, within the context of its then-current environment-specific parameter settings, is configured to run in the target execution environment. As merely examples, workflow analyzer 314 will validate the existence, status, and permissions of any users (e.g., assignees, etc.) and/or content objects (e.g., files, folders, etc.) associated with the workflow template. As earlier mentioned, any issues with run-time variables may not be detected until the workflow is executed. If validation errors are detected, an error alert is issued to user $301_M$ (message 532). In this case, user $301_M$ will need to repeat certain activities (e.g., operation 522 and/or message 524) to address the validation errors. When there are no validation errors remaining, workflow analyzer 314 issues a successful adaptation alert to user $301_M$ (message 534) and activates the validated instance of the environment-specific workflow (message 536). The validated instance of the environment-specific workflow may be subsequently triggered by events that occur in content management system 104.

ADDITIONAL EMBODIMENTS OF THE DISCLOSURE

Instruction Code Examples

Figure 6:
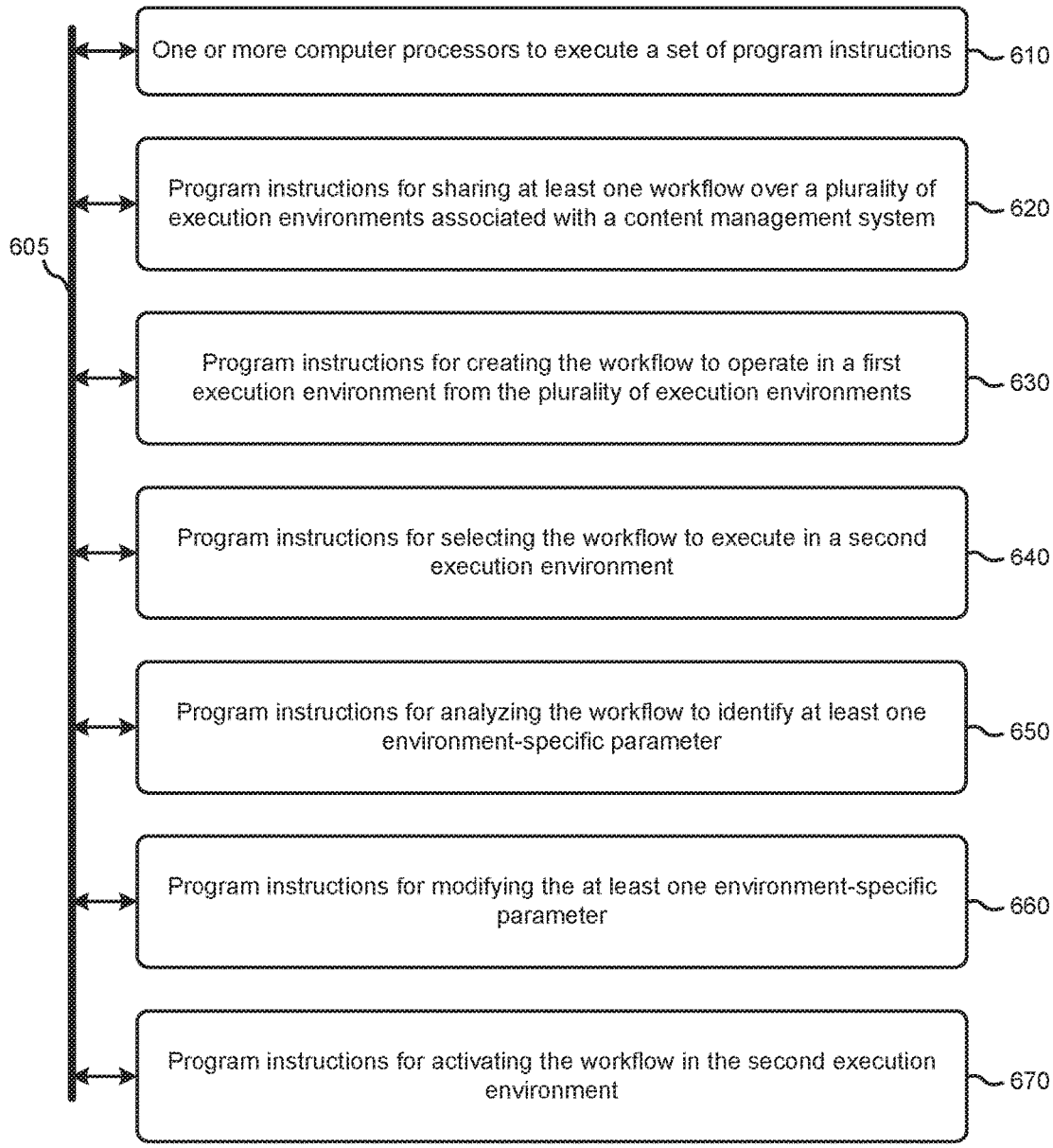
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually or as combined, serve to form improved technological processes that address efficiently sharing workflows over multiple enterprises and environments. The partitioning of system 600 is merely illustrative and other partitions are possible. As an option, system 600 may be implemented in the context of the architecture and functionality of the embodiments described herein. Of course, however, system 600 or any operation therein may be carried out in any desired environment.

System 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims.

The shown embodiment implements a portion of a computer system, presented as system 600, comprising one or more computer processors to execute a set of program code instructions (module 610) and modules for accessing memory to hold program code instructions to perform: sharing at least one workflow over a plurality of execution environments associated with a content management system (module 620); creating the workflow to operate in a first execution environment from the plurality of execution environments (module 630); selecting the workflow to execute in a second execution environment (module 640); analyzing the workflow to identify at least one environment-specific parameter (module 650); modifying the at least one environment-specific parameter (module 660); and activating the workflow in the second execution environment (module 670).

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

System Architecture Overview

Additional System Architecture Examples

Figure 7A:
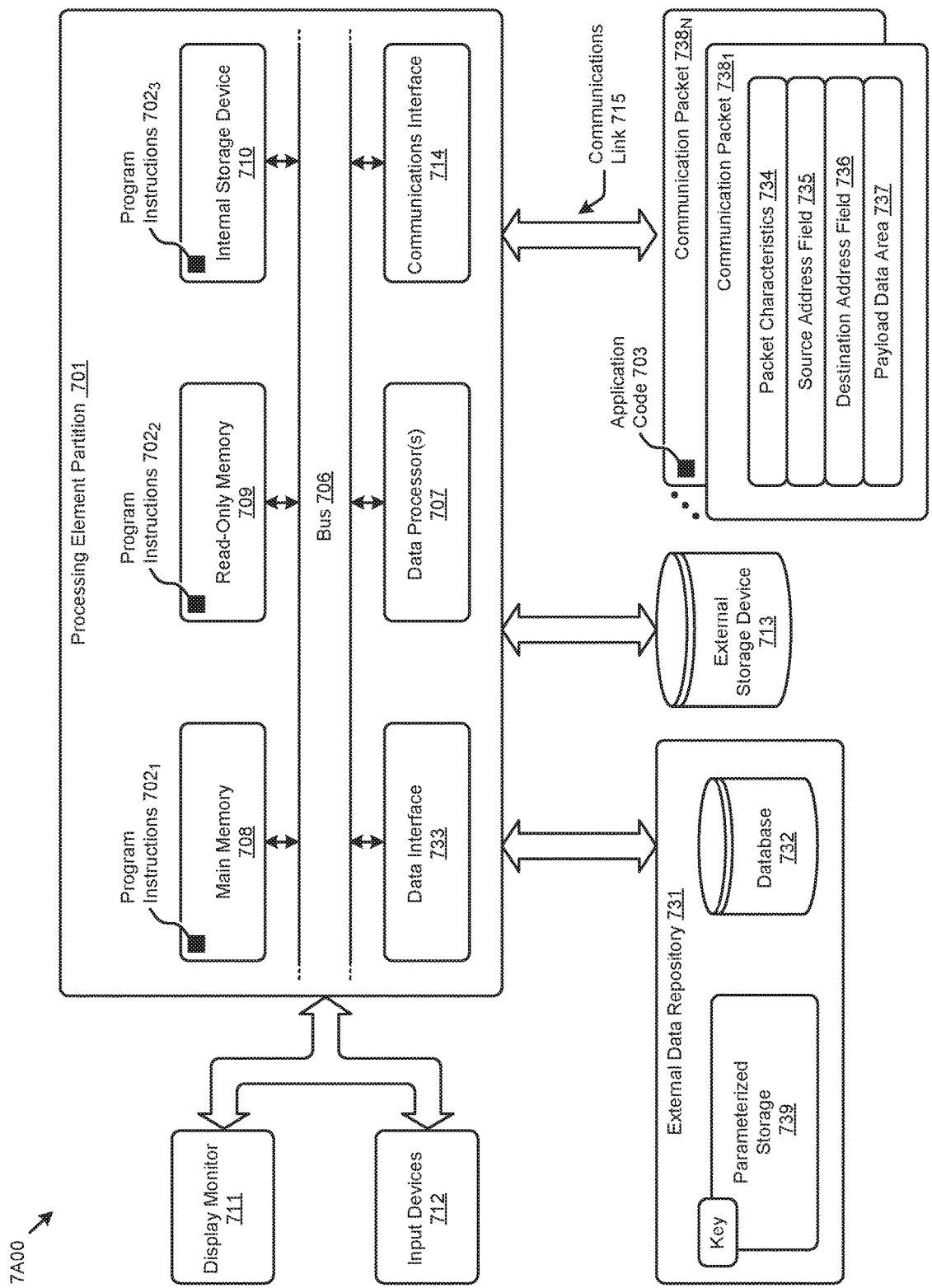
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program instructions may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to adapting workflows for execution in different computing environments. A module may include one or more state machines and/or combinational logic used to implement or facilitate the operational and/or performance characteristics pertaining to adapting workflows for execution in different computing environments.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of adapting workflows for execution in different computing environments). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to adapting workflows for execution in different computing environments, and/or for improving the way data is manipulated when performing computerized operations pertaining to emulating execution of a workflow to configure the workflow for actual execution in a target execution environment.

Figure 7B:
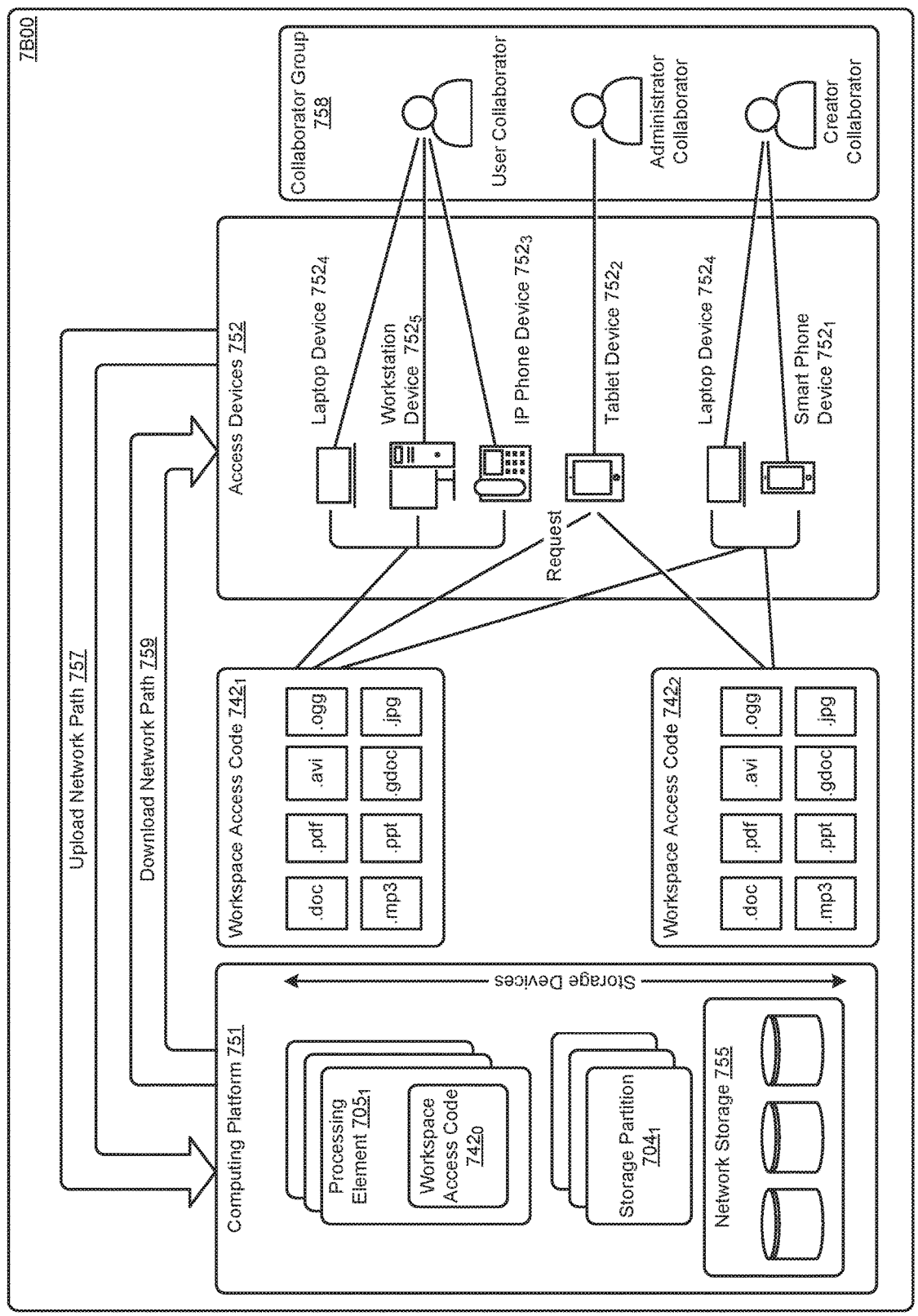

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.), and can be configured to access any type of object. Strictly as examples, such objects can be folders or directories or can be files of any filetype. A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for shared workflow adaptation, the method comprising:

creating a shareable instance of a workflow to operate in a first execution environment for a first group of users, wherein the workflow performs, in the first execution environment corresponding to the first group of users, a first operation over a first set of content objects in a content management system, the workflow has at least one environment-specific parameter corresponding to specific configurations of respective file systems of multiple execution environments, the multiple execution environments respectively comprise a computer setting having one or more computer setting attributes with which computing systems execute workflow instances, and the first execution environment of the multiple execution environments has a configuration of a first file system for communicating with the content management system;

publishing, to a workflow exchange, the shareable instance of the workflow, wherein the workflow exchange maintains a set of shared, different workflows accessible to users over a plurality of execution environments; and implementing the shareable instance of the workflow for execution by a separate computing system having a second file system in a second execution environment to perform a second operation over a second set of content objects in the content management system at least by:

selecting, from the set of shared, different workflows at a shared storage device, the shareable instance of the workflow to perform the second operation in the second execution environment over the second set of content objects;

analyzing the shareable instance of the workflow at least by emulating execution of the shareable instance of the workflow to identify a difference between at least a first value for one or more variables of the at least one environment-specific parameter corresponding to the first file system and at least a second value for the one or more variables of the at least one environment-specific parameter corresponding to the second file system;

programmatically generating an adaptation recommendation based at least in part on the difference, wherein the second execution environment corresponds to a second configuration of the second file system, the adaptation recommendation comprises a recommended value that is used to reconcile the difference so as to execute the shareable instance of the workflow on the separate computing system in the second execution environment with the second configuration; and modifying the shareable instance of the workflow based at least in part on the adaptation recommendation at least by populating the one or more variables with the recommended value for the second execution environment such that the one or more variables are configured to refer to the configuration of the second file system when executing the shareable instance of the workflow in the second executing environment.

2. The method of claim 1, wherein the first execution environment corresponds to a first file system structure, first file system content, first file system folder location, or first file system folder setting, the second execution environment corresponds to a second file system structure, second file system content, second file system folder location, or second file system folder setting, and the first file system structure, first file system content, first file system folder location, or first file system folder setting are respectively different from the second file system structure, second file system content, second file system folder location, or second file system folder setting.

3. The method of claim 1, wherein the one or more workflow objects describing the shareable instance of the workflow are stored in a shared storage location that is accessible by the content management system and the separate computing system that execute respective shareable instances of the workflow, and the adaptation recommendation is used to adapt the shareable instance of the workflow from the first execution environment in which the shareable instance of the workflow is created to one or more second execution environments including the second execution environment so that the one or more second execution environments execute the respective shareable workflow instances at least by respectively referring to corresponding recommendation values for the at least one environment-specific parameter.

4. The method of claim 3, wherein the shared storage location comprises an exchange that stores the shareable instance of the workflow together with at least one shareable instances of a separate workflow in an Internet-accessible location.

5. The method of claim 1, further comprising executing the shareable instance of the workflow in the second execution environment after modification of the shareable instance of the workflow based at least in part on the adaptation recommendation.

6. The method of claim 1, further comprising:

emulating the execution of the shareable instance of the workflow in the second execution environment at least by traversing the shareable instance of the workflow to identify the at least one environment-specific parameter that conflicts with a local environment attribute; and determining a requirement for configuring the workflow for the second execution environment at least by scanning one or more workflow objects that describe the workflow.

7. The method of claim 1, further comprising causing a change to one or more permissions of the second execution environment to access the second set of content objects from the separate computing system.

8. The method of claim 1, wherein the workflow is codified in a structured form comprising JSON (JavaScript Object Notation) that describes the at least one environment-specific parameter.

9. A non-transitory computer readable medium having stored thereon a sequence of instructions which, when stored in memory and executed by one or more processors causes the one or more processors to perform a set of acts for shared workflow adaptation, the set of acts comprising:

creating a shareable instance of a workflow to operate in a first execution environment for a first group of users, wherein the workflow performs, in the first execution environment corresponding to the first group of users, a first operation over a first set of content objects, the workflow has at least one environment-specific parameter corresponding to specific configurations of respective file systems of multiple execution environments, the multiple execution environments respectively comprise a computer setting having one or more computer setting attributes with which computing systems execute workflow instances, and the first execution environment of the multiple execution environments has a first configuration of a first file system for communicating with the content management system;

publishing, to a workflow exchange, the shareable instance of the workflow, wherein the workflow exchange maintains a set of shared, different workflows accessible to users over a plurality of execution environments;

implementing the shareable instance of the workflow for execution by a separate computing system having a second file system in a second execution environment to perform a second operation over a second set of content objects in the content management system at least by:

selecting, from the set of shared, different workflows at a shared storage device, the shareable instance of the workflow to perform the second operation in the second execution environment over the second set of content objects;

analyzing the shareable instance of the workflow at least by emulating execution of the shareable instance of the workflow to identify a difference between at least a first value for one or more variables of the at least one environment-specific parameter corresponding to the first file system and at least a second value for the one or more variables of the at least one environment-specific parameter corresponding to the second file system;

programmatically generating an adaptation recommendation based at least in part on the difference, wherein the second execution environment corresponds to a second configuration of the second file system, the adaptation recommendation comprises a recommended value that is used to reconcile the difference so as to execute the shareable instance of the workflow on the separate computing system in the second execution environment with the second configuration; and modifying the shareable instance of the workflow based at least in part on the adaptation recommendation at least by populating the one or more variables with the recommended value for the second execution environment such that the one or more variables are configured to refer to the second configuration when executing the shareable instance of the workflow in the second executing environment.

10. The non-transitory computer readable medium of claim 9, wherein the first execution environment corresponds to a first file system structure, first file system content, first file system folder location, or first file system folder setting, the second execution environment corresponds to a second file system structure, second file system content, second file system folder location, or second file system folder setting, and the first file system structure, first file system content, first file system folder location, or first file system folder setting are respectively different from the second file system structure, second file system content, second file system folder location, or second file system folder setting.

11. The non-transitory computer readable medium of claim 9, wherein the one or more workflow objects describing the shareable instance of the workflow are stored in a shared storage location that is accessible by the content management system and the separate computing system that execute respective shareable instances of the workflow, and the adaptation recommendation is used to adapt the shareable instance of the workflow from the first execution environment in which the shareable instance of the workflow is created to one or more second execution environments including the second execution environment so that the one or more second execution environments execute the respective shareable workflow instances at least by respectively referring to corresponding recommendation values for the at least one environment-specific parameter.

12. The non-transitory computer readable medium of claim 11, wherein the shared storage location comprises an exchange that stores the shareable instance of the one or more workflow together with at least one shareable instances of a separate workflow in an Internet-accessible location.

13. The non-transitory computer readable medium of claim 9, further comprising instructions which, when stored in memory and executed by the one or more processors causes the one or more processors to perform acts of executing the shareable instance of the workflow in the second execution environment after modification of the shareable instance of the workflow based at least in part on the adaptation recommendation.

14. The non-transitory computer readable medium of claim 9, further comprising instructions which, when stored in memory and executed by the one or more processors causes the one or more processors to perform acts of:

emulating the execution of the shareable instance of the workflow in the second execution environment to identify the at least one environment-specific parameter that conflicts with a local environment attribute; and determining a requirement for configuring the workflow for the second execution environment at least by scanning one or more workflow objects that describe the workflow.

15. The non-transitory computer readable medium of claim 9, further comprising instructions which, when stored in memory and executed by the one or more processors causes the one or more processors to perform acts of causing a change to one or more permissions of the second execution environment to access the second set of content objects from the separate computing system.

16. The non-transitory computer readable medium of claim 9, wherein the workflow is codified in a structured form comprising JSON (JavaScript Object Notation) that describes the at least one environment-specific parameter.

17. A system for shared workflow adaptation, the system comprising:

a non-transitory storage medium having stored thereon a sequence of instructions; and one or more processors that execute the sequence of instructions to cause the one or more processors to perform a set of acts, the set of acts comprising, creating a shareable instance of a workflow to operate in a first execution environment for a first group of users, wherein the workflow performs, in the first execution environment corresponding to the first group of users, a first operation over a first set of content objects, the workflow has at least one environment-specific parameter corresponding to specific configurations of respective file systems of multiple execution environments, the multiple execution environments respectively comprise a computer setting having one or more computer setting attributes with which computing systems execute workflow instances, and the first execution environment of the multiple execution environments has a first configuration of a first file system for communicating with the content management system;

publishing, to a workflow exchange, the shareable instance of the workflow, wherein the workflow exchange maintains a set of shared, different workflows accessible to users over a plurality of execution environments;

implementing the shareable instance of the workflow for execution by a separate computing system having a second file system in a second execution environment to perform a second operation over a second set of content objects in the content management system at least by:

selecting, from the set of shared, different workflows at a shared storage device, the shareable instance of the workflow to perform the second operation in the second execution environment over the second set of content objects;

analyzing the shareable instance of the workflow at least by emulating execution of the shareable instance of the workflow to identify a difference between at least a first value for one or more variables of the at least one environment-specific parameter corresponding to the first file system and at least a second value for the one or more variables of the at least one environment-specific parameter corresponding to the second file system;

programmatically generating an adaptation recommendation based at least in part on the difference, wherein the second execution environment corresponds to a second configuration of the second file system, the adaptation recommendation comprises a recommended value that is used to reconcile the difference so as to execute the shareable instance of the workflow on the separate computing system in the second execution environment with the second configuration; and modifying the shareable instance of the workflow based at least in part on the adaptation recommendation at least by populating the one or more variables with the recommended value for the second execution environment such that the one or more variables are configured to refer to the second configuration when executing the shareable instance of the workflow in the second executing environment.

18. The system of claim 17, wherein the first execution environment corresponds to a first file system structure, first file system content, first file system folder location, or first file system folder setting, the second execution environment corresponds to a second file system structure, second file system content, second file system folder location, or second file system folder setting, and the first file system structure, first file system content, first file system folder location, or first file system folder setting are respectively different from the second file system structure, second file system content, second file system folder location, or second file system folder setting.

19. The system of claim 17, wherein one or more workflow objects describing the shareable instance of the workflow are stored in a shared storage location that is accessible by at least the content management system and the separate computing system that execute respective shareable instances of the workflow, and the adaptation recommendation is used to adapt the shareable instance of the workflow from the first execution environment in which the shareable instance of the workflow is created to one or more second execution environments including the second execution environment so that the one or more second execution environments execute the respective shareable workflow instances at least by respectively referring to corresponding recommendation values for the at least one environment-specific parameter.

20. The system of claim 17, the non-transitory storage medium further comprising instructions which, when stored in memory and executed by the one or more processors, cause the one or more processors to perform acts of:

emulating the execution of the shareable instance of the workflow in the second execution environment to identify the at least one environment-specific parameter that conflicts with a local environment attribute; and determining a requirement for configuring the workflow for the second execution environment at least by scanning one or more workflow objects that describe the workflow.

* * * * *